US010334548B2

(12) United States Patent
Popovic et al.

(10) Patent No.: US 10,334,548 B2
(45) Date of Patent: Jun. 25, 2019

(54) TRANSMITTER, RECEIVER AND METHOD FOR GENERATING SYNCHRONISATION SIGNALS

(71) Applicant: Huawei Technologies Co., Ltd., Shenzhen (CN)

(72) Inventors: Branislav M. Popovic, Kista (SE); Fredrik Berggren, Kista (SE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/140,853

(22) Filed: Apr. 28, 2016

(65) Prior Publication Data

US 2016/0242131 A1 Aug. 18, 2016

Related U.S. Application Data

(63) Continuation of application No. PCT/EP2014/060077, filed on May 16, 2014.
(Continued)

(51) Int. Cl.
*H04W 4/00* (2018.01)
*H04W 56/00* (2009.01)
(Continued)

(52) U.S. Cl.
CPC ........ *H04W 56/002* (2013.01); *H04B 1/7073* (2013.01); *H04J 13/0062* (2013.01);
(Continued)

(58) Field of Classification Search
CPC .................................................. H04W 56/002
See application file for complete search history.

(56) References Cited

U.S. PATENT DOCUMENTS 7,751,490 B2 7/2010 Popovic
8,320,234 B2 11/2012 Berggren
(Continued)

FOREIGN PATENT DOCUMENTS

CN 101641874 A 2/2010
CN 102165840 A 8/2011
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211, v11.4.0, Sep. 2013, 120 pages.
(Continued)

*Primary Examiner* — Farah Faroul
(74) *Attorney, Agent, or Firm* — Slater Matsil, LLP

(57) ABSTRACT

A transmitter and a method therein, configured for generating a synchronization signal for Device-to-Device (D2D) communication utilizing a Single Carrier-Frequency Division Multiple Access (SC-FDMA) waveform. The method includes determining, by a transmitter, a synchronization sequence $d_u[l]$ modulating a set of subcarriers, where $|d_u[l]|=|d_u[L-1-l]|$, $l=0, 1, \ldots, L-1$, and $|d_u[l]|=K$, for a positive constant K, where u is a root index and L is a length of the synchronization sequence $d_u[l]$. The method further includes selecting the root index u from a set of root indices, and generating a synchronization signal for D2D communication utilizing an SC-FDMA waveform based on the determined synchronization sequence $d_u[l]$ and the selected root index u.

20 Claims, 7 Drawing Sheets

Related U.S. Application Data

(60) Provisional application No. 61/898,973, filed on Nov. 1, 2013.

(51) Int. Cl.

| | | |
|---|---|---|
| *H04J 13/00* | (2011.01) | |
| *H04L 27/26* | (2006.01) | |
| *H04B 1/7073* | (2011.01) | |
| *H04L 5/00* | (2006.01) | |

(52) U.S. Cl.
CPC ........ *H04J 13/0074* (2013.01); *H04L 5/0053* (2013.01); *H04L 27/2613* (2013.01); *H04L 27/2636* (2013.01); *H04L 27/2692* (2013.01); *H04J 2211/006* (2013.01)

(56) References Cited

U.S. PATENT DOCUMENTS

| | | | |
|---|---|---|---|
| 8,811,374 B2 | 8/2014 | Charbit et al. | |
| 8,923,464 B2 | 12/2014 | Tavildar et al. | |
| 9,414,337 B2* | 8/2016 | Kim | H04W 56/0015 |
| 9,439,039 B1* | 9/2016 | Patil | H04W 4/023 |
| 9,451,570 B2* | 9/2016 | Cheng | H04W 8/005 |
| 9,509,458 B2* | 11/2016 | Kim | H04W 56/00 |
| 9,867,230 B2* | 1/2018 | Ro | H04W 8/005 |
| 2007/0254656 A1 | 11/2007 | Dalsgaard | |
| 2008/0043668 A1 | 2/2008 | Chen et al. | |
| 2008/0273582 A1 | 11/2008 | Gaal et al. | |
| 2008/0310567 A1 | 12/2008 | Popovic | |
| 2009/0086713 A1* | 4/2009 | Luo | H04J 11/0073 370/350 |
| 2009/0323629 A1 | 12/2009 | Lindoff et al. | |
| 2010/0034305 A1 | 2/2010 | Popovic | |
| 2010/0135150 A1 | 6/2010 | Berggren | |
| 2010/0195479 A1 | 8/2010 | Lipka et al. | |
| 2010/0272055 A1* | 10/2010 | Noh | H04L 5/0007 370/329 |
| 2011/0182280 A1 | 7/2011 | Charbit et al. | |
| 2011/0280200 A1 | 11/2011 | Fuchs et al. | |
| 2012/0014349 A1* | 1/2012 | Chung | H04B 7/0684 370/329 |
| 2012/0134443 A1 | 5/2012 | Popovic | |
| 2013/0034130 A1 | 2/2013 | Forenza et al. | |
| 2013/0229998 A1* | 9/2013 | Noh | H04L 5/001 370/329 |
| 2013/0288608 A1* | 10/2013 | Fwu | H04W 72/02 455/63.1 |
| 2013/0294437 A1 | 11/2013 | Tsai et al. | |
| 2014/0010108 A1 | 1/2014 | Tavildar et al. | |
| 2014/0029602 A1* | 1/2014 | Han | H04L 5/0007 370/350 |
| 2014/0064263 A1* | 3/2014 | Cheng | H04W 8/005 370/350 |
| 2014/0099950 A1 | 4/2014 | Mildh et al. | |
| 2014/0286293 A1 | 9/2014 | Jang et al. | |
| 2014/0341208 A1 | 11/2014 | Charbit et al. | |
| 2014/0348063 A1* | 11/2014 | Kang | H04L 5/0048 370/328 |
| 2015/0117375 A1 | 4/2015 | Sartori et al. | |
| 2015/0124579 A1* | 5/2015 | Sartori | H04J 11/00 370/210 |
| 2015/0304149 A1* | 10/2015 | Kim | H04W 56/00 375/260 |
| 2016/0014774 A1 | 1/2016 | Seo | |
| 2016/0073408 A1* | 3/2016 | Sartori | H04W 72/0453 370/329 |
| 2016/0205644 A1* | 7/2016 | Seo | H04W 56/00 370/350 |
| 2016/0212724 A1* | 7/2016 | Seo | H04W 56/0025 |
| 2016/0242131 A1 | 8/2016 | Popovic et al. | |
| 2016/0286506 A1 | 9/2016 | Chae et al. | |
| 2016/0337159 A1* | 11/2016 | Seo | H04W 56/002 |
| 2017/0127365 A1* | 5/2017 | Sartori | H04J 11/00 |
| 2017/0202057 A1* | 7/2017 | Ro | H04W 8/005 |
| 2017/0230926 A1* | 8/2017 | Seo | H04W 56/0015 |
| 2017/0273041 A1* | 9/2017 | Seo | H04W 76/023 |

FOREIGN PATENT DOCUMENTS

| | | |
|---|---|---|
| CN | 102769868 A | 11/2012 |
| CN | 102780993 A | 11/2012 |
| CN | 103068032 A | 4/2013 |
| CN | 103108389 A | 5/2013 |
| CN | 103108405 A | 5/2013 |
| CN | 103379617 A | 10/2013 |
| JP | 2017502550 A | 1/2017 |
| RU | 2439831 C2 | 1/2012 |
| WO | 2015065017 A1 | 5/2015 |

OTHER PUBLICATIONS

LTE, "3rd Generation Partnership Project; Technical Specification Group Services and System Aspects; Feasibility stufy for Proximity Services (ProSe) (Release 12)," 3GPP TR 22.803 V12.0.0, Technical Report, Dec. 2012, 40 pages.

Popovic, B.M., et al., "Primary Synchronization Signal in E-UTRA," Spread Spectrum Techniques and Applications, IEEE 10th International Symposium, Aug. 25-28, 2008, 5 pages.

"WF on the D2D Synchronization Procedure," 3rd Generation Partnership Project (3GPP), Mobile Competence Centre; F-06921, R1-134925, 7.2.8.1.1, France, Oct. 11, 2013, 4 pages.

"On the Design of D2DSS and PD2DSCH," Agenda Item: 7.2.8.11, Source: LG Electronics, Document for: Discussion and Decision, 3GPP TSG RAN WG1 Meeting #76, R1-140839, Prague, Czech, Feb. 10-14, 2014, 8 pages.

Tsai, S. et al., "Enhanced Performance for an Approximately MAI-Free Multiaccess OFDM Transceiver by Code Selection," IEEE 60th Vehicular Technology Conference, vol. 6, Sep. 26-29, 2004, 5 pages.

"3rd Generation Partnership Project; Technical Specification Group, Radio Access Network; Evolved Universal Terrestrial Radio Access (E-UTRA); Physical Channels and Modulation (Release 8)," 3GPP TS 36.211, V8.5.0, Dec. 2008, 82 pages.

"Design Considerations for D2DSS," Agenda Item: 6.2.8.1.1, Source: Huawei, HiSilicon, Document for: Discussion and Decision, 3GPP TSG RAN WG1 Meeting #75, R1-135532, Nov. 11-15, 2013, 5 pages.

"Design Considerations for D2DSS," Agenda Item: 7.2.8.1.1, Source: Huawei, HiSilicon, Document for: Discussion and Decision, 3GPP TSG RAN WG1 Meeting #76, R1-140207, Feb. 10-14, 2014, 8 pages.

"UE based D2D Synchronization Scheme," Agenda Item: 7.2.8.1.1, Source: Nokia, NSN, Document for: Discussion and Decision, 3GPP TSG-RAN WG1 Meeting #74bis, R1-134536, Oct. 7-11, 2013, 4 pages.

"WF on D2D Terminology for Synchronization," Ericsson, 3GPP TSG-RAN WG1 Meeting #74bis, R1-134883, Oct. 9, 2013, 5 pages.

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0, Sep. 2009, 83 pages.

"Draft Report of 3GPP TSG RAN WG1 #74bis v0.2.0," Source: MCC Support, Document for: Comment, 3GPP TSG RAN WG1 Meeting #75, R1-13xxxx, San Francisco, USA, Nov. 11-15, 2013, 89 pages.

"P-SCH Sequences," Agenda Item: 7.2 SCH and Cell Search, Source: Huawei, Document for: Discussion and Decision, TSG RAN WG1 Meeting #49, R1-072321, Kobe, Japan, May 7-11, 2007, 6 pages.

"WF on D2D Terminology for Synchronization," Ericsson, R1-134883, 7.2.8.1.1, Oct. 9, 2013, 5 pages.

"PD2DSS Root Indices Selection," Agenda item: 7.2.1.1.2, Source: ZTE, Document for: Discussion/Decision, R1-143813, 3GPP TSG-RAN WG1 #78bis, Ljubljana, Slovenia, Oct. 6-10, 2014, 7 pages.

"3rd Generation Partnership Project; Technical Specification Group Radio Access Network; Evolved Universal Terrestrial Radio Access

(56) References Cited

OTHER PUBLICATIONS (E-UTRA); LTE physical layer; General description (Release 11)," 3GPP TS 36.201 V11.1.0, Dec. 2012, 13 pages.
"3rd Generation Partnership Project; Technical Specification Group Radio Access Network; Evolved Universal Terrestrial Radio Access (E-UTRA); Multiplexing and channel coding (Release 11)," 3GPP TS 36.212 V11.3.0, Jun. 2013, 84 pages.
"3rd Generation Partnership Project; Technical Specification Group Radio Access Network; Evolved Universal Terrestrial Radio Access (E-UTRA); Physical layer procedures (Release 11)," 3GPP TS 36.213 V11.4.0, Sep. 2013, 182 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.7.0, Sep. 2013, 209 pages.
"3rd Generation Partnership Project; Technical Specification Group Radio Access Network; Evolved Universal Terrestrial Radio Access (E-UTRA); User Equipment (UE) procedures in idle mode (Release 11)," 3GPP TS 36.304 V11.5.0, Sep. 2013, 34 pages.
"3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321 V11.3.0, Jun. 2013, 57 pages.
"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.311 V11.5.0, Sep. 2013, 347 pages.
"Comparison of SC-FDMA and OFDMA for multiple access schemes for D2D link." Source: Fujitsu, Agenda Item: 7.2.8.1.2, Document for: Discussion and decision, 3GPP TSG-RAN WG1 Meeting #74bis, R1-134260, Guangzhou, Guangdong, P.R.China, Oct. 7-11, 2013, 2 pages.

\* cited by examiner

TRANSMITTER, RECEIVER AND METHOD FOR GENERATING SYNCHRONISATION SIGNALS

This application is a continuation of International Application No. PCT/EP2014/060077, filed on May 16, 2014, which claims priority to U.S. Patent Application No. 61/898,973, filed on Nov. 1, 2013, both of which are hereby incorporated by reference in their entireties.

TECHNICAL FIELD

Implementations described herein generally relate to a transmitter, a method in a transmitter and a receiver. In particular, a mechanism is herein described, for generating a synchronization signal for Device-to-Device (D2D) communication utilizing a Single Carrier-Frequency Division Multiple Access (SC-FDMA) waveform.

BACKGROUND

A mobile terminal, also known as a User Equipment (UE), wireless terminal and/or mobile station is enabled to communicate wirelessly in a wireless communication network, sometimes also referred to as a cellular radio system. The communication may be made, e.g., between two mobile terminals, between a mobile terminal and a wire-connected telephone and/or between a mobile terminal and a server via a Radio Access Network (RAN) and possibly one or more core networks. The wireless communication may comprise various communication services such as voice, messaging, packet data, video, broadcast, etc.

The mobile terminal may further be referred to as mobile telephone, cellular telephone, computer tablet or laptop with wireless capability, etc. The mobile terminal in the present context may be, for example, portable, pocket-storable, hand-held, computer-comprised, or vehicle-mounted mobile terminals, enabled to communicate voice and/or data, via the radio access network, with another entity, such as another mobile terminal, a stationary entity or a server.

The wireless communication network covers a geographical area which is divided into cell areas, with each cell area being served by a radio network node or base station, e.g., a Radio Base Station (RBS) or Base Transceiver Station (BTS), which in some networks may be referred to as "eNB," "eNodeB," "NodeB" or "B node," depending on the technology and/or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any mobile station within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE), radio network nodes, which may be referred to as eNodeBs or eNBs, may be connected to a gateway, e.g., a radio access gateway, to one or more core networks. LTE is based on the GSM/EDGE and UMTS/HSPA network technologies, increasing the capacity and speed using a different radio interface together with core network improvements.

LTE-Advanced, i.e., LTE Release10 and later releases are set to provide higher bitrates in a cost efficient way and, at the same time, completely fulfil the requirements set by International Telecommunication Union (ITU) for the International Mobile Telecommunications (IMT)-Advanced, sometimes also referred to as 4G (abbreviation for "fourth generation").

Communications in emergency situations cannot rely only on cellular systems infrastructure, such as for example the LTE system, as it can be out of function, like in cases of earthquakes, tsunamis, snow storms, hurricanes, etc. In some areas, there may not even exist any cellular system coverage at all. Therefore there is currently ongoing standardization work to specify technical solutions that would allow LTE terminals, or mobile terminals to directly communicate with each other and even possibly relay information sent from a single terminal via another terminal, or multiple other terminals. The direct communication between terminals, also known as Device-to-Device (D2D) communication, should be possible both with and/or without the presence of LTE cellular infrastructure. In other words, such private handheld devices are supposed to form a backup, ad hoc communication network in disasters when existing communication infrastructure is not functioning or there is no cellular coverage to begin with. For public safety applications, broadcast communications may be utilized, i.e., the same information could be received by a number of D2D users.

A further application is that a mobile terminal in vicinity of other mobile or stationary terminals should be able to discover such terminals and thereafter be able to establish D2D communication. Discovery mechanism may also be applicable to commercial applications where a D2D user could set up direct communications with close-by friends or be used for advertising. Thus, such discovery may occur even if the terminals are under the coverage of an LTE system, i.e., independently of the LTE system.

In order to establish the initial contact, each mobile terminal should be able to transmit and receive D2D Synchronization Signals (D2DSS), which could serve at the receiver, e.g., both as the discovery signals and as a tool to establish time and frequency synchronization with the transmitting mobile terminal. The basic signal property of a D2DSS is that it should provide an impulse-like aperiodic auto-correlation function in order to provide reliable detection at the receiver. It should also be possible to detect the D2DSS with low-complexity with a corresponding matched filter in the receiver. As there might be a number of concurrent D2D communication links in a rather small geographical area, multiple D2DSSs with low cross-correlation should be available, which may be selected, e.g., randomly, based on signal measurements, or by any predefined rules, by mobile terminals so that even in case of signal collisions at the receiver, there is a chance that a D2DSS can be reliably detected.

In the present context, the expressions downlink, downstream link or forward link may be used for the transmission path from the radio network node to the mobile terminal. The expression uplink, upstream link or reverse link may be used for the transmission path in the opposite direction, i.e., from the mobile terminal to the radio network node.

In one example, D2D communications may be specified in uplink (UL) resources, i.e., in the UL carrier for Frequency-Division Duplexing (FDD) or in UL subframes for Time-Division Duplexing (TDD). In the latter case, a mobile terminal which is connected or is connecting to the LTE network may receive a D2DSS sent from another mobile terminal which is not synchronized to, or located within the coverage of the LTE network, while receiving synchronization signals sent in the downlink (DL) from the radio network node. The D2DSS should therefore be clearly distinguishable from all the LTE DL synchronization signals.

In order to minimize the complexity of the LTE terminals that support D2D communication, it is clear that the basic D2D transmission method should be the same as either on LTE DL, which is Orthogonal Frequency Division Multiplexing (OFDM), or as on LTE UL, which is Single-Carrier Frequency Division Multiple Access (SC-FDMA). It can be assumed that the future LTE D2D communications and the D2DSS can operate either in LTE FDD UL bands or in UL subframes in TDD mode. SC-FDMA and OFDM are technically both OFDM signals; however, SC-FDMA uses a ½ subcarrier shift and allows modulation of the all subcarriers, in contrast to OFDM which uses an un-modulated DC subcarrier, wherein the frequency would be equal to the Radio Frequency center frequency of the radio network node.

There were two key aspects that governed the design of the Primary Synchronization Signal (PSS)/Secondary Synchronization Signal (SSS) in Rel-8, which largely also should be prioritized for a D2DSS: detection performance and receiver complexity.

Detection performance depends on the amount of resources allocated to the synchronization signal, as well as the characteristics of the signals, e.g., cross-correlations.

The receiver typically performs matched filtering to detect the PSS. Receiver complexity depends on the ability to utilize certain signal properties to mainly reduce the number of complex-valued multiplications in the receiver. The PSS has a time-domain central symmetry, i.e., a signal value appears up to two times in an OFDM symbol which allows for reducing the number of multiplications by 50% by performing addition of symmetric samples prior to multiplication with the replica sample. There are three different PSSs, which are obtained from three different modulation sequences (i.e., PSS sequences). Further-more, two of the PSS sequences constitute a complex-conjugated sequence pair and due to the time-domain central symmetry, they also become a complex conjugated signal pair, which makes it possible to detect both PSSs with the same multiplication complexity as detecting one PSS. The SSS is based on m-sequences, for which Fast Hadamard Trans-forms could be used in the detector. It has been observed that the cell searcher contributes to 10-15% of the total baseband cost of the LTE modem. Therefore, it is crucial that a D2DSS will support low-complex receiver implementations and that as much as possible from the existing PSS/SSS detector implementations may be reused.

The D2DSS transmitted in the LTE TDD mode and the existing PSS transmitted from a radio network node, or eNodeB, may give rise to mutual interference. For example, as illustrated in FIG. 1a, a legacy mobile terminal may try to detect the PSS of the radio network node of the LTE system, e.g., for cell selection, while not being able to succeed in accessing a cell if D2D terminals in its vicinity transmit a D2DSS having large cross-correlation with the PSS, see FIG. 1a. In this situation the legacy terminal has no prior synchronization to the radio network node and will search for the PSS also in UL subframes, wherein the D2DSS may be transmitted.

In another illustrated example in FIG. 1b, a D2D terminal located outside LTE network coverage will not be able to access any cell but may occasionally still receive the LTE synchronization signals, PSS/SSS, see FIG. 1b. These signals would constitute interference while trying to detect the D2DSS. In this situation the D2D terminal has no synchronization to the radio network node and the PSS may be detected in subframes, wherein the D2DSS may be received.

Even if the LTE PSS and the D2DSS would use different waveforms, it can be shown that the cross-correlation between the LTE PSS (based on OFDM waveforms) and a D2DSS obtained from SC-FDMA waveform modulated with the same PSS sequence, exhibits two strong cross-correlation peaks, corresponding to about 50% of the signal energy. Further-more, the peak cross-correlation is more than 50% higher than the maximum auto-correlation side lobe of D2DSS. Table 1 gives an example of correlation values when the D2DSS is using the same modulation sequence as for the PSS but is utilizing the SC-FDMA waveform. The term root index refers to a parameter in the modulation sequence definition and different root indices result in different sequences.

TABLE 1

| Root index (u) | Auto-correlation: Maximum false peak correlation | Cross-correlation: Maximum false peak, (root index) | Cross-correlation with PSS: Maximum false peak, (PSS root index) |
|---|---|---|---|
| u = 25 | 0.24 | 0.38, (u = 34) | 0.47, (u = 25) |
| u = 29 | 0.24 | 0.40, (u = 34) | 0.47, (u = 29) |
| u = 34 | 0.24 | 0.38, (u = 25) | 0.47, (u = 34) |

Such interference levels are not desirable, as the maximum cross-correlation should not be significantly higher than the maximum auto-correlation side lobe, in order to be able to keep the same detection threshold in the receiver as if there were no interference, i.e., as on an Additive White Gaussian Noise (AWGN) channel. With these cross-correlation peaks, the detection threshold has to be increased in order to preserve the targeted false alarm rate, which will cause the detection probability to be decreased.

The LTE PSS sequence is chosen and mapped to the subcarriers in such a way that the resulting PSS is centrally symmetric in the time-domain. The PSS is generated as an OFDM signal, where the DC subcarrier, i.e., frequency k=0 is un-modulated. A discrete form of the signal may be represented by:

$$s[n] = \frac{1}{\sqrt{N}} \sum_{k=0}^{N-1} H[k] e^{\frac{j2\pi nk}{N}}$$

for n=0, 1, . . . , N−1. In order to obtain central symmetry in the time-domain, i.e., s[n]=s[N−n], n=1, . . . , N−1, the PSS is mapped to the subcarriers such that the following relation holds for the Fourier coefficients H[k]=H[N−k], k=1, 2, . . . , N−1.

The central symmetry of N−2 samples of the PSS may be used to reduce the number of multiplications in the corresponding matched filter. For example, if the PSS has length of N samples, it can be shown that there are N−2 centrally symmetric samples in the PSS signal, i.e., there are (N−2)/2 unique sample values and additionally 2 samples which may not be equal to any other sample. Thus, by performing addition of the symmetric samples prior to multiplication with the replica symbol, the matched filter can be implemented by (N−2)/2+2 multiplications per single correlation, which is reduction of about 50% compared to the direct implementation which requires N multiplications, i.e., one multiplication per input sample. An example of an LTE receiver for the PSS is illustrated in FIG. 1c, where "*" denotes complex conjugation and $s_u[n]$ are the values of the PSS with root index u.

FIG. 1c thus illustrates an efficient matched filter for PSS signal detection using N samples. Furthermore, three different PSSs are defined in LTE, which are obtained from three different PSS sequences. Two of the sequences constitute a complex conjugated version of each other. That is, there are two root indices u and v which generates PSS sequences such that the resulting PSSs are related by $s_u[n]=s_v^*[n]$. Therefore, since a complex conjugate only implies sign change to the imaginary part of the received sample, it is possible to detect both these PSSs with the multiplication complexity of just one of the sequences. That is, no extra multiplications are needed for computing the correlation of the conjugated signal, i.e., a complexity reduction of 50%. The central symmetry is preserved for any value of root-index u, allowing having just a single matched filter structure, with fixed connections between hardware elements, which can be thus reused for the detection of different D2DSS signals by changing just the replica signal.

The centrally symmetric PSS is obtained from the LTE PSS sequence d[n] generated from a frequency-domain Zadoff-Chu sequence of length 63 according to:

$$d_u[n] = \begin{cases} e^{-j\frac{\pi u n(n+1)}{63}}, & n = 0, 1, ..., 30 \\ e^{-j\frac{\pi u (n+1)(n+2)}{63}}, & n = 31, 32, ..., 61 \end{cases}$$

where u∈{25,29,34} is referred to as a set of root indices. The sequence d[n] shall be mapped to the resource elements according to:

$$a_{k,l} = d[n], n = 0, 1, ..., 61$$

$$k = n - 31 + \frac{N_{RB}^{DL} N_{sc}^{RB}}{2}.$$

The time-continuous low-pass signal $s_l^{(p)}(t)$ on antenna port p in OFDM symbol l in a downlink slot is defined by:

$$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lceil N_{RB}^{DL} N_{sc}^{RB}/2 \rceil} a_{k^{(+)},l}^{(p)} \cdot e^{j2\pi k \Delta f(t-N_{CP,l}T_s)}$$

for $0 \le t < (N_{CP,l}+N) \times T_s$ where $$k^{(-)} = k + \left\lfloor \frac{N_{RB}^{DL} N_{sc}^{RB}}{2} \right\rfloor \text{ and } k^{(+)} = k + \left\lfloor \frac{N_{RB}^{DL} N_{sc}^{RB}}{2} \right\rfloor - 1$$

and $a_{k,l}^{(p)}$ is the content of resource element (k,l) on antenna port p. The variable N equals 2048 for Δf=15 kHz subcarrier spacing and 4096 for Δf=7.5 kHz subcarrier spacing. The entities $N_{CP,l}, N_{RB}^{DL}$ and $N_{sc}^{RB}$ are further defined in the LTE specifications.

The SC-FDMA waveform is in LTE such that the time-continuous low-pass signal $s_l^{(p)}(t)$ for antenna port p in SC-FDMA symbol l in an uplink slot is defined by:

$$s_l^{(p)}(t) = \sum_{k=-\lfloor \frac{N_{RB}^{UL} N_{sc}^{RB}}{2} \rfloor}^{\lceil \frac{N_{RB}^{UL} N_{sc}^{RB}}{2} \rceil - 1} a_{k^{(-)},l}^{(p)} \cdot e^{j2\pi(k+1/2)\Delta f(t-N_{CP,l}T_s)}$$

for $0 \le t < (N_{CP,l}+N) \times T_s$ where $k^{(-)} = k + \lfloor N_{RB}^{UL} N_{sc}^{RB}/2 \rfloor$. The variable N equals 2048 for Δf=15 kHz subcarrier spacing and $a_{k,l}^{(p)}$ is the content of resource element (k,l) on antenna port p. The entities $T_s, N_{CP,l}, N_{RB}^{UL}$ and $N_{sc}^{RB}$ are further defined in the LTE specifications.

In the context of this disclosure, an SC-FDMA waveform is referring to multi-carrier signal without any un-modulated DC subcarrier and where the subcarriers are allocated with half a subcarrier offset in relation to the DC frequency.

SUMMARY

The presented embodiments include new synchronization sequences for D2DSS utilizing the SC-FDMA waveform, while at the same time exhibit signal symmetry which allows for efficient receiver implementation.

According to a first aspect, a transmitter is provided, configured for generating a synchronization signal for Device-to-Device (D2D) communications utilizing a Single Carrier-Frequency Division Multiple Access (SC-FDMA) waveform, wherein a synchronization sequence is modulating a set of subcarriers. The transmitter comprises a processor, configured for determining a synchronization sequence, where $$|d_u[l]|=|d_u[L-1-l]|, l=0,1,\ldots,L-1; \text{ and } |d_u[l]|=K$$

for a positive constant K wherein u is a root index and L is the length of the synchronization sequence. The processor is also configured for selecting the root index u from a set of root indices. In addition, the processor is configured for generating the synchronization signal, based on the determined synchronization sequence and the selected root index u.

Thereby, timely and efficient synchronization signal detection is enabled, with eliminated or at least reduced interference with other synchronization signals such as, e.g., PSS and/or SSS.

In a first possible implementation of the transmitter according to the first aspect, the processor may be further configured for determining the synchronization sequence, such that $d_u[l]=d_u[L-1-l], l=0,1,\ldots,L-1$.

Thereby, an alternative implementation of the synchronization sequence is presented, having low interference with other signaling while putting low requirements on the receiver for its implementation.

In a second possible implementation of the transmitter according to the first aspect, or the first possible implementation of the first aspect, the processor may be further configured for obtaining a centrally anti-symmetric D2D synchronization sequence of even length from a centrally symmetric D2D synchronization sequence of even length by multiplying the elements of one of the synchronization sequence halves by −1.

Thereby, yet an alternative implementation is presented. An advantage of using a centrally anti-symmetric signal is that it has very low cross-correlation with a centrally symmetric signal. Hence, when the signals are time aligned, if the D2DSS is centrally anti-symmetric, it may have low cross-correlation with the LTE PSS, which is centrally symmetric.

In a third possible implementation of the transmitter according to the first aspect, or any of the previous implementations of the first aspect, the processor may be configured for determining the synchronization sequence, such that:

$$d_u[n] = \begin{cases} e^{-j\frac{\pi un(n+1)}{63}}, & n = 0, 1, \ldots, 30 \\ e^{-j\frac{\pi u(n+1)(n+2)}{63}}, & n = 31, 32, \ldots, 61 \end{cases}$$

and also configured for selecting the root index u to an integer different from 25, 29 and 34.

An advantage according to such implementation is that interference with any PSS signal may be avoided or reduced by selecting different root index u than used in PSS signaling.

In a fourth possible implementation of the transmitter according to the first aspect, or any of the previous implementations of the first aspect, the processor may be configured for determining the synchronization sequence by selecting a Zadoff-Chu sequence of odd length, and removing an odd number of elements from the selected Zadoff-Chu sequence, to obtain a synchronization sequence of even length.

Thus an efficient and yet easily implemented synchronization signal is achieved.

In a fifth possible implementation of the transmitter according to the first aspect, or any of the previous implementations, the processor may be configured for determining the synchronization sequence by selecting a Zadoff-Chu sequence of even length, extending the selected Zadoff-Chu sequence by one element, and removing a central element of the extended Zadoff-Chu sequence.

Thus an efficient and yet easily implemented synchronization signal is achieved.

In a sixth possible implementation of the transmitter according to the first aspect, or any of the previous implementations, the processor may be configured for determining the synchronization sequence such that $$d_u[n] = W_L^{\frac{un(n+1)}{2}},$$

n=0, 1, . . . , L−1, L even; and $$W_L = e^{-\frac{j2\pi}{L}}$$

Thus an efficient and yet easily implemented synchronization signal is achieved.

In a seventh possible implementation of the transmitter according to the first aspect, or any of the previous implementations, the processor may be configured for mapping the synchronization sequence to the resource elements of the SC-FDMA signal, such that for the Fourier coefficients |H[k]|=|H[N−1−k]|, k=0, 1, . . . , N−1, where N is an integer not smaller than L.

Thus an efficient and yet easily implemented synchronization signal is achieved.

In an eighth possible implementation of the transmitter according to the first aspect, or any of the previous implementations, the processor may be configured for mapping the synchronization sequence to the resource elements of the SC-FDMA signal, such that for the Fourier coefficients: H[k]=H[N−1−k], k=0, 1, . . . , N−1.

Thus an efficient and yet easily implemented synchronization signal is achieved.

In a ninth possible implementation of the transmitter according to the first aspect, or any of the previous possible implementations, the processor may be configured for mapping the synchronization sequence to the resource elements of the SC-FDMA signal, such that for the Fourier coefficients: H[k]=−H[N−1−k], k=0, 1, . . . , N−1.

Thus an efficient and yet easily implemented synchronization signal is achieved.

In a tenth possible implementation of the transmitter according to the first aspect, or any of the previous possible implementations, the processor may be configured for selecting the root index u from the set of root indices either randomly, or by deriving it from one or more parameters internal to the transmitter.

An advantage of this implementation comprises increased flexibility in the selection of root index in the synchronization signal.

In an eleventh possible implementation of the transmitter according to the first aspect, or any of the previous possible implementations, the processor may be configured for selecting the root index u from the set of root indices based on information received from a serving radio network node, or based on a received signal; and/or selecting the root index u from a first set of root indices when receiving a synchronization signal from another D2D transmitter being synchronized to a cell, and from a second set of root indices when receiving a synchronization signal from another D2D transmitter not being synchronized to a cell; and/or by selecting either the same, or a different, root index u as has been utilized in a received synchronization signal; and/or, when the synchronization signal is transmitted over multiple hops between network nodes selecting the root index u from the set of root indices based on the number of hops of the received synchronization signal.

An advantage of this implementation comprises increased flexibility in the selection of root index in the synchronization signal.

According to a second aspect, a method is provided, for use in a transmitter. The method aims at generating a synchronization signal for D2D communications utilizing a SC-FDMA waveform, wherein a synchronization sequence is modulating a set of subcarriers. The method comprises determining synchronizations sequence, where |d[l]|=|d_u[L−1−l]|, l=0, 1, . . . , L−1 and |d_u[l]|=K, for a positive constant K, wherein u is a root index and L is the length of the synchronization sequence. Also, the method comprises selecting the root index u from a set of root indices. Further the method in addition comprises generating the synchronization signal, based on the determined synchronization sequence and the selected root index u.

Thereby, timely and efficient synchronization signal detection is enabled, with eliminated or at least reduced interference with other synchronization signals such as, e.g., PSS and/or SSS.

In a first possible implementation of the method according to the second aspect, the method also may comprise determining the synchronization sequence such that $d_u[l]=-d_u[L-1-l]$, $l=0, 1, \ldots, L-1$.

Thereby, an alternative implementation of the synchronization sequence is presented, having low interference with other signaling while putting low requirements on the receiver for its implementation.

In a second possible implementation of the method according to the second aspect, or the first possible implementation, a centrally anti-symmetric D2D synchronization sequence of even length may be obtained from a centrally symmetric D2D synchronization sequence of even length by multiplying the elements of one of the synchronization sequence halves by −1.

Thereby, yet an alternative implementation is presented. An advantage of using a centrally anti-symmetric signal is that it has very low cross-correlation with a centrally symmetric signal. Hence, when the signals are time aligned, if the D2DSS is centrally anti-symmetric, it may have low cross-correlation with the LTE PSS, which is centrally symmetric.

In a third possible implementation of the method according to the second aspect, or any of the previous implementations of the first aspect, the synchronization sequence may be determined, such that:

$$d_u[n] = \begin{cases} e^{-j\frac{\pi u n(n+1)}{63}}, & n = 0, 1, \ldots, 30 \\ e^{-j\frac{\pi u(n+1)(n+2)}{63}}, & n = 31, 32, \ldots, 61 \end{cases}$$

and also configured for selecting the root index u to an integer different from 25, 29 and 34.

An advantage according to such implementation is that interference with any PSS signal may be avoided or reduced by selecting a different root index u than used in PSS signaling.

In a fourth possible implementation of the method according to the second aspect, or any of the previous implementations of the second aspect, the synchronization sequence may be determined by selecting a Zadoff-Chu sequence of odd length, and removing an odd number of elements from the selected Zadoff-Chu sequence, to obtain a synchronization sequence of even length.

Thus an efficient and yet easily implemented synchronization signal is achieved.

In a fifth possible implementation of the method according to the second aspect, or any of the previous implementations, the synchronization sequence may be determined by selecting a Zadoff-Chu sequence of even length, extending the selected Zadoff-Chu sequence by one element, and removing a central element of the extended Zadoff-Chu sequence.

Thus an efficient and yet easily implemented synchronization signal is achieved.

In a sixth possible implementation of the method according to the second aspect, or any of the previous implementations, the synchronization sequence may be determined such that $d_u[n]=W_L^{un(n+1)/2}$, $n=0,1,\ldots,L-1$, L even; and $W_L=e^{-j2\pi/L}$.

Thus an efficient and yet easily implemented synchronization signal is achieved.

In a seventh possible implementation of the method according to the second aspect, or any of the previous implementations, the synchronization sequence may be mapped to the resource elements of the SC-FDMA signal, such that for the Fourier coefficients: $|H[k]|=|H[N-1-k]|$, $k=0, 1, \ldots, N-1$, where N is an integer, not smaller than L.

Thus an efficient and yet easily implemented synchronization signal is achieved.

In an eighth possible implementation of the method according to the second aspect, or any of the previous implementations, the synchronization sequence may be mapped to the resource elements of the SC-FDMA signal, such that for the Fourier coefficients: $H[k]=H[N-1-k]$, $k=0, 1, \ldots, N-1$.

Thus an efficient and yet easily implemented synchronization signal is achieved.

In a ninth possible implementation of the method according to the second aspect, or any of the previous possible implementations, the synchronization sequence may be mapped to the resource elements of the SC-FDMA signal, such that for the Fourier coefficients: $H[k]=-H[N-1-k]$, $k=0, 1, \ldots, N-1$.

Thus an efficient and yet easily implemented synchronization signal is achieved.

In a tenth possible implementation of the method according to the second aspect, or any of the previous possible implementations, the root index u may be selected randomly, from a set of root indices.

An advantage of this implementation comprises increased flexibility in the selection of root index in the synchronization signal.

In an eleventh possible implementation of the method according to the second aspect, or any of the previous possible implementations, the root index u may be selected from the set of root indices by deriving it from one or more parameters internal to the transmitter.

An advantage of this implementation comprises increased flexibility in the selection of root index in the synchronization signal.

In a twelfth possible implementation of the method according to the second aspect, or any of the previous possible implementations, the root index u may be selected from the set of root indices, based on information received from a serving radio network node.

An advantage of this implementation comprises increased flexibility in the selection of root index in the synchronization signal.

In a thirteenth possible implementation of the method according to the second aspect, or any of the previous possible implementations, the root index u may be selected from the set of root indices, based on a received signal.

An advantage of this implementation comprises increased flexibility in the selection of root index in the synchronization signal.

In a fourteenth possible implementation of the method according to the second aspect, or any of the previous possible implementations, the root index u may be selected from a first set of root indices when receiving a synchronization signal from another D2D transmitter synchronized to a cell, and from a second set of root indices when receiving a synchronization signal from a D2D transmitter not synchronized to a cell.

An advantage of this implementation comprises increased flexibility in the selection of root index in the synchronization signal.

In a fifteenth possible implementation of the method according to the second aspect, or any of the previous possible implementations, the same root index u may be selected as has been utilised in a received synchronization signal.

An advantage of this implementation comprises increased flexibility in the selection of root index in the synchronization signal.

In a fifteenth possible implementation of the method according to the second aspect, or any of the previous possible implementations, a different root index u may be selected as has been utilised in a received synchronization signal.

An advantage of this implementation comprises increased flexibility in the selection of root index in the synchronization signal.

In a sixteenth possible implementation of the method according to the second aspect, or any of the previous possible implementations, the synchronization signal may be transmitted over multiple hops between network nodes and wherein the root index u may be selected from the set of root indices based on the number of hops of the received synchronization signal.

An advantage of this implementation comprises increased flexibility in the selection of root index in the synchronization signal.

According to a further aspect, a computer program comprising program code for performing a method in a transmitter according to the second aspect, or any implementation of the second aspect, is provided for generating a synchronization signal for D2D communications utilizing an SC-FDMA waveform, wherein a synchronization sequence is modulating a set of subcarriers, when the computer program is loaded into a processor of the transmitter, according to the first aspect, or any implementation of the first aspect.

Thereby, timely and efficient synchronization signal detection is enabled, with eliminated or at least reduced interference with other synchronization signals such as, e.g., PSS and/or SSS.

According to a yet an additional aspect, a computer program product comprising a computer readable storage medium storing program code thereon for generating a synchronization signal for D2D communications utilizing an SC-FDMA waveform, wherein a synchronization sequence is modulating a set of subcarriers. The program code comprising instructions for executing a method that comprises determining a synchronization sequence, where $|d_u[l]|=|d_u[L-1-l]|$, $l=0, 1, \ldots, L-1$ and $|d_u[l]|=K$, for a positive constant K, wherein u is a root index and L is the length of the synchronization sequence; selecting the root index u from the set of root indices; and generating the synchronization signal, based on the determined synchronization sequence and the selected root index u.

Thereby, timely and efficient synchronization signal detection is enabled, with eliminated or at least reduced interference with other synchronization signals such as, e.g., PSS and/or SSS.

According to a further additional aspect, a receiver configured for detecting a received synchronization signal for D2D communications utilizing an SC-FDMA waveform, wherein a synchronization sequence is modulating a set of subcarriers is provided. The receiver comprises a processor, configured for detecting the synchronization signal comprising a synchronization sequence, where $|d_u[l]|=|d_u[L-1-l]|$, $l=0, 1, \ldots, L-1$, and $|d_u[l]|=K$, for a positive constant K, wherein u is a root index and L is the length of the synchronization sequence.

Thereby, timely and efficient synchronization signal detection is enabled, with eliminated or at least reduced interference with other synchronization signals such as, e.g., PSS and/or SSS.

Other objects, advantages and novel features of the described aspects will become apparent from the following detailed description.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the invention described herein are defined as a transmitter, a method in a transmitter and a receiver, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
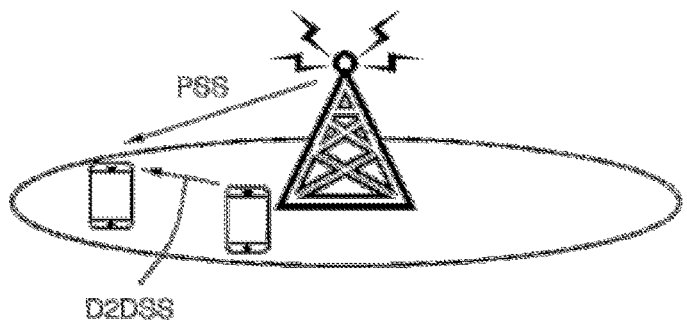
FIG. 1a is a block diagram illustrating a conventional wireless communication network.
Figure 1B:
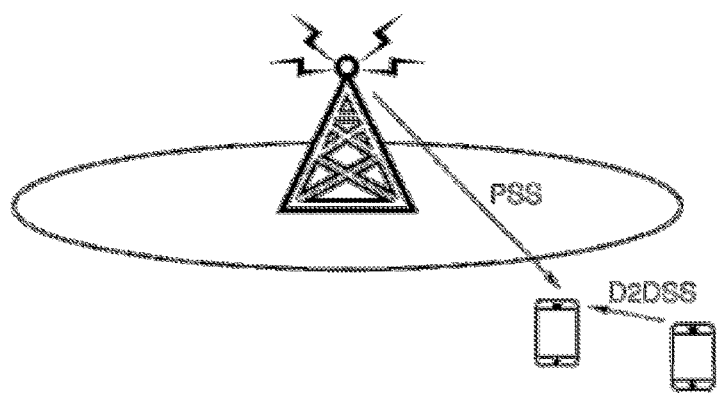
FIG. 1b is a block diagram illustrating a conventional wireless communication network.
Figure 1C:
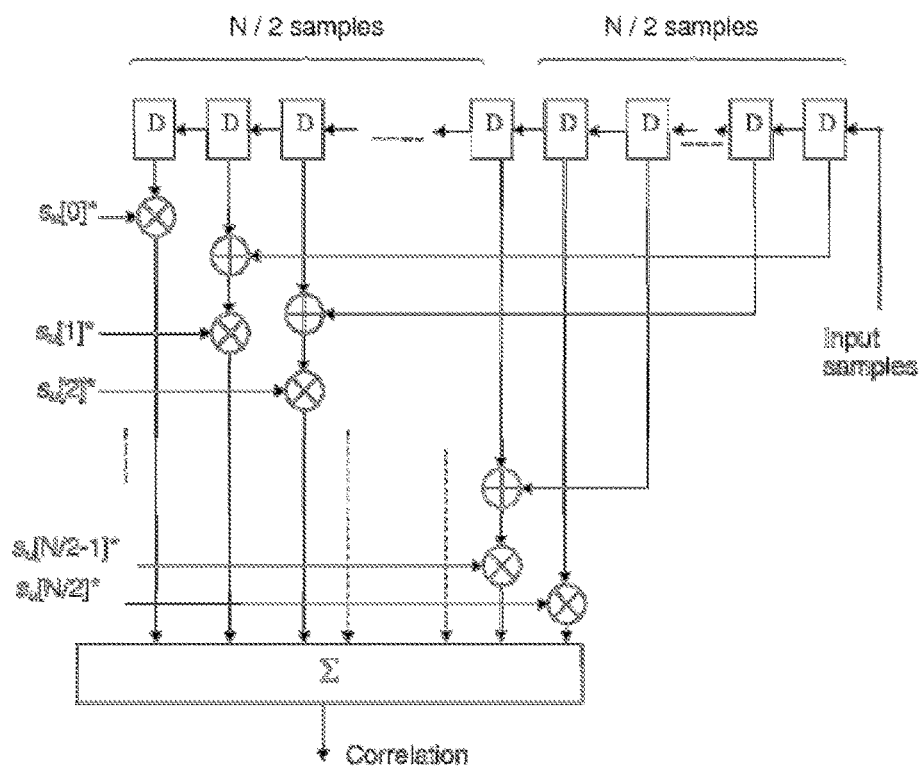
FIG. 1c is a block diagram illustrating a conventional transmitter.
Figure 2A:
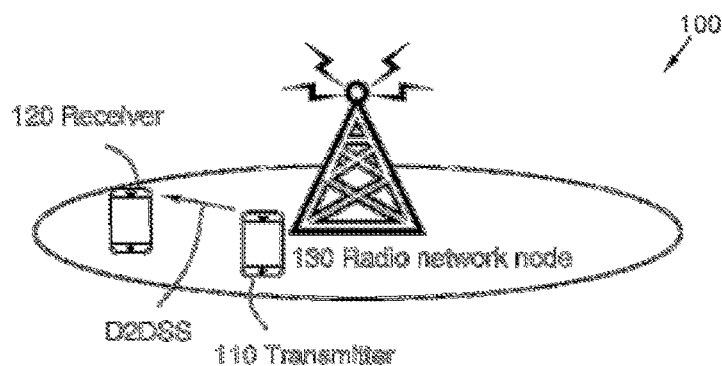
FIG. 2a is a block diagram illustrating a wireless communication network in an embodiment.

FIG. 2a is a schematic illustration over a wireless communication network 100 comprising a transmitter 110, a receiver 120 and a radio network node 130. The transmitter 110 and/or the receiver 120 may be mobile terminals, which may be served by the radio network node 130, thereby being connected to the wireless communication network 100.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilized interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signaling. FDD means that the transmitter and receiver operate at different carrier frequencies.

The purpose of the illustration in FIG. 2a is to provide a simplified, general overview of the wireless communication network 100 and the involved methods and nodes, such as the transmitter 110, the receiver 120 and the radio network node 130 herein described, and the functionalities involved. The method, the transmitter 110, the receiver 120 and the radio network node 130 will subsequently, as a non-limiting example, be described in a 3GPP LTE/LTE-Advanced environment. However the disclosed embodiments may operate in a wireless communication network 100 based on another access technology such as, e.g., any of the above already enumerated. Thus, although the embodiments of the invention are described based on, and using the lingo of, 3GPP LTE systems, it is by no means limited to 3GPP LTE. Further, the terms radio network node, network node, base station, and cell may be used interchangeably in the sequel.

The illustrated transmitter 110 in the wireless communication network 100 may send synchronization signals to be received by the receiver 120.

Figure 2B:
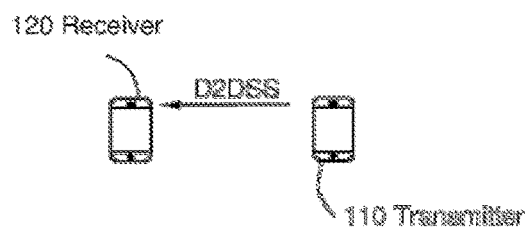
FIG. 2b is a block diagram illustrating a transmitter and a receiver in an embodiment.

FIG. 2b illustrates an example wherein the transmitter 110 and the receiver 120 are situated outside any wireless communication network 100, i.e., LTE network. The transmitter 110 transmits a D2D synchronization signal (D2DSS) to be received by the receiver 120.

Figure 2C:
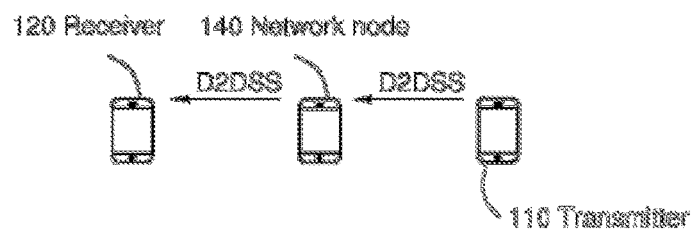
FIG. 2c is a block diagram illustrating a transmitter, a receiver and a network node in an embodiment.

FIG. 2c illustrates yet an embodiment wherein multi-hop is illustrated. The transmitter 110 transmits a D2DSS to be received by the receiver 120, via an intermediately situated other network node 140.

It is to be noted that the illustrated settings of FIG. 2a, FIG. 2b and/or FIG. 2c of one instance of the transmitter 110, one instance of the receiver 120 and possibly one radio network node 130 or other network node 140 in FIG. 2a, FIG. 2b and/or FIG. 2c are to be regarded as non-limiting examples of embodiments only. The wireless communication network 100 may comprise any other number and/or combination of the discussed entities 110, 120, 130, 140. A plurality of transmitters 110, receivers 120, other network nodes 140 and another configuration of radio network nodes 130 may thus be involved in some embodiments of the disclosed invention. Thus, e.g., when reference is made herein to multi-hop over another network node 140, the other network node 140 may comprise a set of a plurality of other network nodes 140, according to some embodiments.

Thus whenever "one" or "a/an" transmitter 110, receiver 120 other network node 140 and/or radio network node 130 is referred to in the present context, a plurality of the transmitter 110, receiver 120 other network node 140 and/or radio network node 130 may be involved, according to some embodiments.

The transmitter 110, the receiver 120 and/or the other network node 140 may correspondingly be represented by, e.g., a wireless communication terminal, a mobile cellular phone, a Personal Digital Assistant (PDA), a wireless platform, a mobile station a user equipment, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with each other by direct communication and possibly also with the radio network node 130, according to different embodiments and different vocabulary.

Further, the radio network node 130 and/or the other network node 140, according to some embodiments, may be configured for downlink transmission and uplink reception, and may be referred to, respectively, as, e.g., a base station, a NodeB, an evolved Node Bs (eNB, or eNode B), a base transceiver station, an Access Point Base Station, a base station router, a Radio Base Station (RBS), a micro base station, a pico base station, a femto base station, a Home eNodeB, a sensor, a beacon device, a relay node, a repeater or any other network node configured for communication with the mobile stations within cell coverage over a wireless interface, depending, e.g., of the radio access technology and/or terminology used.

Some embodiments of the invention may define a modular implementation approach, and make it possible to reuse legacy systems such as, e.g., standards, algorithms, implementations, components and products.

The SC-FDMA waveform without a cyclic prefix can be defined by:

$$s(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k+\lfloor N_{RB}^{UL} N_{sc}^{RB}/2 \rfloor} \cdot e^{j2\pi(k+1/2)\Delta ft}$$

for $0 \leq t < N \times T_s$. According to the LTE standard, $$N = \frac{f_s}{\Delta f} \leq N_{RB}^{UL} N_{sc}^{RB},$$

hence it is possible to define:

$$H[k] = \begin{cases} a_{k+\lfloor N_{RB}^{UL} N_{sc}^{RB}/2 \rfloor}, & -\lfloor N_{RB}^{UL} N_{sc}^{RB}/2 \rfloor \leq k \leq \lceil N_{RB}^{UL} N_{sc}^{RB}/2 \rceil - 1 \\ 0, & \text{elsewhere} \end{cases}$$

and $$s(t) = \sum_{k=-\lfloor N/2 \rfloor}^{\lceil N/2 \rceil - 1} H[k] \cdot e^{j2\pi(k+1/2)\Delta ft}.$$

The sampled version is obtained by setting: $t=n/f_s$ which gives (comprising a normalization factor $1/\sqrt{N}$), a low-pass equivalent signal:

$$s[n] = \frac{1}{\sqrt{N}} \sum_{k=-\lfloor N/2 \rfloor}^{\lceil N/2 \rceil - 1} H[k] e^{\frac{j2\pi n(k+1/2)}{N}}$$

for n=0, 1, . . . , N-1 where H[k] is a Fourier coefficient at frequency k. A cyclic prefix may be inserted in the representation. Since $$e^{\frac{j2\pi n(N-k+1/2)}{N}} = e^{\frac{j2\pi n(-k+1/2)}{N}}$$

and defining H[k]=H[k+N], an alternative representation (still without cyclic prefix) is:

$$s[n] = \frac{1}{\sqrt{N}} \sum_{k=0}^{N-1} H[k] e^{\frac{j2\pi n(k+1/2)}{N}} = e^{\frac{j2\pi n(1/2)}{N}} \frac{1}{\sqrt{N}} \sum_{k=0}^{N-1} H[k] e^{\frac{j2\pi nk}{N}}$$

Then, from the definition of the SC-FDMA signal, conditions for obtaining a centrally symmetric signal for n=1, . . . , N may be deduced from:

$$s[N-n] = -e^{\frac{-j2\pi n(1/2)}{N}} \frac{1}{\sqrt{N}} \sum_{k=0}^{N-1} H[k] e^{\frac{-j2\pi nk}{N}}$$

$$= -e^{\frac{-j2\pi n(1/2)}{N}} \frac{1}{\sqrt{N}} \sum_{p=0}^{N-1} H[N-1-p] e^{\frac{-j\pi n(N-1-p)}{N}}$$

$$= -e^{\frac{-j2\pi n(1/2)}{N}} e^{\frac{j2\pi n}{N}} \frac{1}{\sqrt{N}} \sum_{p=0}^{N-1} H[N-1-p] e^{\frac{j2\pi np}{N}}$$

$$= -e^{\frac{j2\pi n(1/2)}{N}} \frac{1}{\sqrt{N}} \sum_{p=0}^{N-1} H[N-1-p] e^{\frac{j2\pi np}{N}}.$$

This relationship may be utilized to identify requirements on the Fourier coefficients in order to obtain certain symmetries in the signal. It is therefore realized that:
i) If H[k]=H[N-1-k], k=0, 1, . . . , N-1, then s[n]=s[N-n], n=1, . . . , N-1.
ii) If H[k]=-H[N-1-k], k=0, 1, . . . , N-1, then s[n]=s[N-n], n=1, . . . , N-1.

A property s[n]=-s[N-n], n=1, . . . , N-1 may be referred to as a centrally anti-symmetric signal.
A property s[n]=s[N-n], n=1, . . . , N-1 may be referred to as a centrally symmetric signal.
An advantage of using a centrally anti-symmetric signal is that it has very low cross-correlation with a centrally symmetric signal. For example, assume a centrally anti-symmetric signal where x[n]=x[N-n], n=1, . . . , N-1, and a centrally symmetric signal where y[n]=y[N-n], n=1, . . . , N-1. Then, when the signals are aligned in time, the cross-correlation becomes $$\left| \sum_{n=0}^{N-1} x[n] y^*[n] \right| = \begin{cases} |x[0]y^*[0] + x[N/2]y^*[N/2]|, & N \text{ even} \\ |x[0]y^*[0]|, & N \text{ odd} \end{cases}$$

which is typically much smaller than the signal energy $|\Sigma_{n=0}^{N-1} x[n]x^*[n]|$. Hence, when the signals are time aligned, if the D2DSS is centrally anti-symmetric, it may have low cross-correlation with the LTE PSS, which is centrally symmetric.

One embodiment of the invention comprises defining a D2DSS wherein the Fourier coefficients are according to |H[k]|=|H[N-1-k]|, k=0, 1, . . . , N-1.

A first embodiment comprises defining a D2DSS wherein the Fourier coefficients are according to H[k]=H[N-1-k], k=0, 1, . . . , N-1.

A second embodiment comprises defining a D2DSS wherein the Fourier coefficients are according to H[k]=-H[N-1-k], k=0, 1, . . . , N-1.

Figure 3:
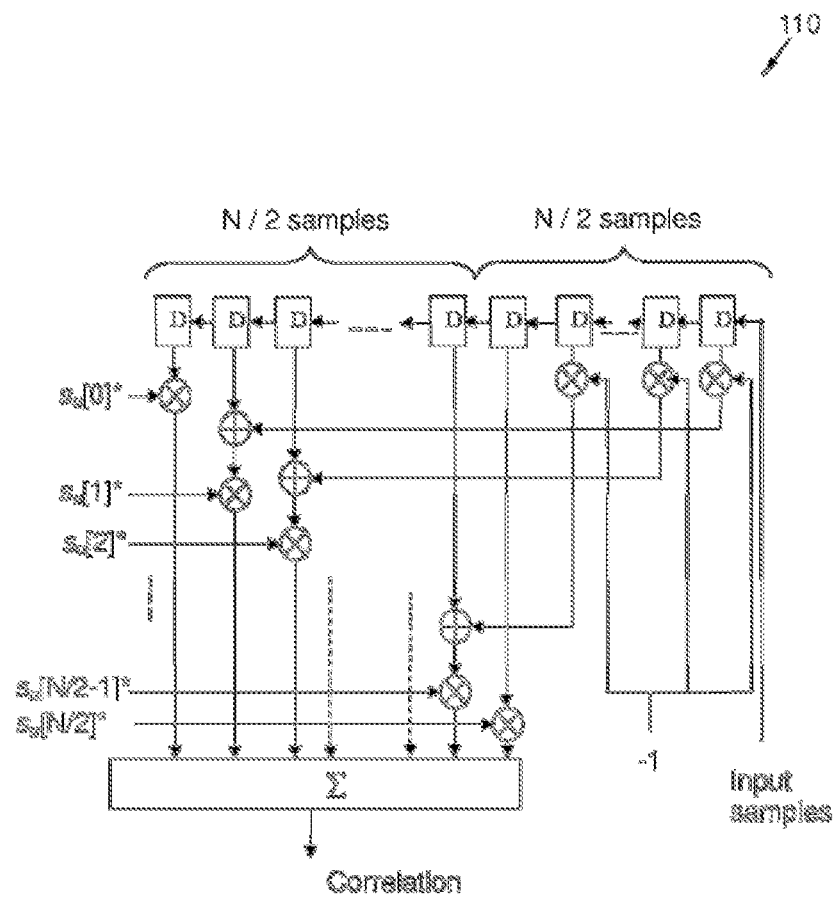
FIG. 3 is a block diagram illustrating a transmitter according to an embodiment.

FIG. 3 depicts an example of a receiver 120 for a centrally anti-symmetric signal, utilizing only N/2+1 multiplications for an input signal of length N. It may further be realized that:

$$s[\pm n + N] = \frac{1}{\sqrt{N}} \sum_{k=0}^{N-1} H[k] e^{\frac{j2\pi(\pm n+N)(k+1/2)}{N}} =$$

$$-e^{\frac{j2\pi(\pm n)(1/2)}{N}} \frac{1}{\sqrt{N}} \sum_{k=0}^{N-1} H[k] e^{\frac{j2\pi(\pm n)k}{N}} = -s[\pm n].$$

Therefore, according to the first embodiment, for two different sets of Fourier coefficients where $H_u[k]=H^*_v[k]$, it follows that:

$$s_u[n] = e^{\frac{-j2\pi(-n)(1/2)}{N}} \frac{1}{\sqrt{N}} \sum_{k=0}^{N-1} H_v^*[k] e^{\frac{-j2\pi(-n)k}{N}} =$$

$$s_v^*[-n] = -s_v^*[N-n] = s_v^*[n].$$

An advantage of this property is that $s_u[n]$ and $s_v[n]$ can be detected with multiplication complexity of just one of the signals. That is, if a matched filter is designed for $s_u[n]$, due to the above relationship, no further complex valued multiplications may be required for computing a correlation value corresponding to $s_v[n]$, according to some embodiments.

Therefore, according to the second embodiment, for two different sets of Fourier coefficients where $H_u[k]=H^*_v[k]$, it follows that:

$$s_u[n] =$$

$$e^{\frac{-j2\pi(-n)(1/2)}{N}} \frac{1}{\sqrt{N}} \sum_{k=0}^{N-1} H_v^*[k] e^{\frac{-j2\pi(-n)k}{N}} = s_v^*[-n] = -s_v^*[N-n] = -s_v^*[n].$$

An advantage of this property is that $s_u[n]$ and $s_v[n]$ may be detected with multiplication complexity of just one of the signals. That is, if a matched filter is designed for $s_u[n]$, due to the above relationship, no further complex valued multiplications are needed for computing a correlation value corresponding to $s_v[n]$.

According to some embodiments, a D2D synchronization sequence is defined based on a sequence $d_u[l]$, $l=0, 1, \ldots, L-1$ where $L \leq N$, such that when it is mapped to the Fourier coefficients (i.e., $d_u[l] \rightarrow H_u[k]$), either property i) or ii) as defined at page 20, last paragraph is fulfilled. Hence, the D2D sequences may be centrally symmetric or anti-symmetric, in order to produce centrally anti-symmetric or symmetric SC-FDMA D2DSS, respectively.

In one embodiment, a centrally symmetric sequence exhibits a property $|d_u[l]|=|d_u[L-1-l]|$, $l=0, 1, \ldots, L-1$, where $|\cdot|$ denotes the absolute value.

In one embodiment, a centrally symmetric sequence exhibits a property $d_u[l]=d_u[L-1-l]$, $l=0, 1, \ldots, L-1$.

In one embodiment, a centrally anti-symmetric sequence exhibits a property $d_u[l]=-d_u[L-1-l]$, $l=0, 1, \ldots, L-1$.

It may further be realized that once the receiver 120 has detected and obtained synchronization from the D2DSS, the synchronization sequence is known to the receiver 120. Thus, the sequence may be utilized as reference symbols for estimating the channel. This would allow coherent detection of other signals or channels, utilizing channel estimates from the D2DSS. For reliable channel estimation, it is desirable that all reference symbols (i.e., sequence elements) are using the same transmit power. It is also beneficial for the transmitter to use the same transmit power of the symbols as it makes the power control less complex. Hence, in an embodiment, the synchronization sequence exhibits a property $|d_u[l]|=K$ where K is a positive constant.

When $L \leq N$, the remaining $N-L$ Fourier coefficients in some cases (e.g., when L and N are even) may be set to zero and property i) or ii) is fulfilled. Furthermore, when at least one of the remaining $N-L$ Fourier coefficients is not set to zero, it may be regarded as a superposition of a centrally symmetric or centrally anti-symmetric synchronization signal (obtained from L Fourier coefficients) and an arbitrary signal (obtained from the remaining $N-L$ Fourier coefficients). In that case, property i) or ii) applies only to the synchronization signal. However, this may not be a problem in practice, since filtering may be done to suppress the signals from the remaining $N-L$ Fourier coefficients such that the receiver 120 only experiences the signals obtained from the L Fourier coefficients, in some embodiments.

In some embodiments, D2D synchronization sequences of even length which are centrally symmetric may be utilized.

In some embodiments, D2D synchronization sequences of even length which are centrally anti-symmetric may be utilized.

One embodiment comprises constructing a centrally anti-symmetric D2D synchronization sequence of even length from a centrally symmetric D2D synchronization sequence of even length by multiplying the first half or the second half of its elements by −1. For example if there is a centrally symmetric D2D synchronization sequence:

$$d_u[n] = \begin{cases} e^{-j\frac{\pi u n(n+1)}{63}}, & n = 0, 1, \ldots, 30 \\ e^{-j\frac{\pi u(n+1)(n+2)}{63}}, & n = 31, 32, \ldots, 61 \end{cases},$$

then a centrally anti-symmetric sequence may be defined by:

$$\tilde{d}_u[n] = \begin{cases} d_u[n] & n = 0, 1, \ldots, 30 \\ -d_u[n] & n = 31, 32, \ldots, 61 \end{cases}$$

or $$\tilde{d}_u[n] = \begin{cases} -d_u[n] & n = 0, 1, \ldots, 30 \\ d_u[n] & n = 31, 32, \ldots, 61. \end{cases}$$

An advantage of this is lower implementation complexity since both the radio network node 130 and the transmitter 110 already are capable of generating the centrally symmetric LTE PSS sequence $d_u(n)$.

One embodiment comprises constructing a centrally symmetric D2D synchronization sequence of even length from a centrally anti-asymmetric D2D synchronization sequence of even length by multiplying the first half or the second half of its elements by −1.

In the following embodiments a number of centrally symmetric sequences are disclosed for giving some non-limiting examples of sets of root indices. The terms "root index" and "index" respectively, are used somewhat interchangeably herein. Centrally anti-symmetric sequences may be generated from the disclosed centrally symmetric sequences in some embodiments. The performance may depend on the chosen set of root indices. The set of indices will be known to both the transmitter 110 and the receiver 120.

The root index u may be selected by the transmitter 110 from a given set of root indices in some embodiments. When the transmitter 110 is connected to a cell, the radio network node 130 may signal information to the transmitter 110, which may explicitly or implicitly indicate which root index u to be used. In the latter case, the radio network node 130 may, e.g., signal a physical layer identity from which the root index u may be derived. An advantage of signaling the root index is that the radio network node 130 may perform coordination between time-frequency resources used for the D2DSS and the root indices, in order to minimize the mutual interference in the system. The root index u may also in some embodiments be selected without any prior signaling information from the network 100. This would be advantageous in order to minimize the control signaling in the cell. In one example, the transmitter 110 may derive the root index u randomly or from parameters internal to the transmitter 110. Moreover, the transmitter 110 may select the root index u based on other received signals. For example, when the transmitter 110 receives a D2DSS from another D2D transmitter which is synchronized to a cell, the transmitter 110 may select a root index u from a first set of root indices, while when the transmitter 110 receives a D2DSS from another D2D transmitter which is not synchronized to a cell, the transmitter 110 may select a root index u from a second set of root indices in some embodiments. This is advantageous since a receiver 120 may then select which D2DSS it should synchronize to, based on information on the synchronization source, e.g., a synchronization source which has synchronized to a cell may be more reliable. In another example, if the transmitter 110 receives a D2DSS, it may select the same root index u as the received D2DSS. Alternatively, if the transmitter 110 receives a D2DSS, it may select a different root index u as the received D2DSS. Furthermore, if D2DSS transmissions may be relayed among network nodes 140, e.g., being transmitted over multiple hops, and if the transmitter 110 receives a D2DSS, and if it is able to determine for how many hops the D2DSS has been transmitted, it may select the root index u based on the number of hops. This is advantageous since the receiver 120 may then select which D2DSS it should synchronize to, based on information on the synchronization source, e.g., a D2DSS with less hops may be more reliable. The root index selection may also comprise a combination of the above examples in some embodiments.

In one embodiment, the LTE PSS sequence is used as a D2DSS sequence but with different root indices. Table 2 illustrates correlation properties for an example where the set of root indices is u∈{26,37,38}. Since the sequence is obtained from a punctured Zadoff-Chu sequence of length 63, typically u may be a relatively prime (sometimes also referred to as mutually prime or coprime/co-prime) to 63. It may further be realized that if two root indices u and v are related by u=63−v, the sequences constitute a complex conjugated pair and the corresponding D2DSS signals will exhibit a complex conjugated pair property.

TABLE 2

| Root index | Auto-correlation: Maximum false peak correlation | Cross-correlation with PSS: Maximum false peak, (PSS root index) |
|---|---|---|
| u = 26 | 0.25 | 0.21 |
| u = 37 | 0.25 | 0.21 |
| u = 38 | 0.25 | 0.21 |

The maximum cross-correlation among the D2DSSs generated from the set of root indices u∈{26,37,38} is 0.29.

In one embodiment, Zadoff-Chu sequences of odd length L are used for which R elements are removed to obtain a sequence of even length (e.g., length 62). R may be a value not smaller than 3. An odd length Zadoff-Chu sequence may be defined as follows, where u is relatively prime to L.

$$d_u(n) = W_L^{un(n+1)/2}, n=0,1,\ldots,L-1$$

$$W_L = e^{-j2\pi/L}$$

Since $d_u(n) = d^*_{L-u}(n)$, n=0, 1, . . . , L−1, the same complex-conjugate relationship among root indices u and L−u will exist when R elements have been removed. Hence the advantage of being able to detect two D2DSSs with the multiplication complexity of just one D2DSS may be achieved.

The removal of the R elements should assure that the remaining sequence is centrally symmetric or centrally anti-symmetric. In one example, this is achieved by removing the central R elements. It is further realized that such symmetries could be achieved by other removal options, e.g., removing one or several central elements and additionally, elements in the beginning and the end of the sequence. In order to preserve good auto-correlation and Peak-to-Average-Power-Ratio (PAPR) properties of Zadoff-Chu sequences, it is desirable that R is as small as possible. If targeted length is 62, then it may be beneficial to use L=65 and R=3. Since the sequence is obtained from a punctured Zadoff-Chu sequence of length 65, typically u may be selected as a relatively prime to 65. When two root indices u and v are related by u=65−v, the corresponding D2DSS signal will exhibit a complex conjugated pair property.

Table 3 illustrates correlation properties for an example where the set of root indices is u∈{22,24,43}.

TABLE 3

| Root index | Auto-correlation: Maximum false peak correlation | Cross-correlation with PSS: Maximum false peak, (PSS root index) |
|---|---|---|
| u = 22 | 0.26 | 0.24 |
| u = 24 | 0.24 | 0.31 |
| u = 43 | 0.26 | 0.31 |

The maximum cross-correlation among the D2DSSs generated from the set of root indices u∈{22,24,43} is 0.21.

In one embodiment, Zadoff-Chu sequences of even length L may be used which are cyclically extended to length L+1 and where the central element is removed. An even length Zadoff-Chu sequence may be defined as follows, where u may be relatively prime to L:

$$d_u(n) = W_L^{\frac{un^2}{2}}, n=0, 1, \ldots, L-1$$

$$W_L = e^{-j2\pi/L}.$$

Furthermore, $d_u(n) = (-1)^n d^*_{L-u}(n)$, n=0, 1, . . . , L−1. Hence, this relationship may be utilized to determine an association between the D2DSSs corresponding to indices u and L−u.

The obtained punctured and extended sequence may be described as:

$$d_u(n) = \begin{cases} e^{-j\frac{\pi u n^2}{L}}, & n = 0, 1, \ldots, \frac{L}{2}-1 \\ e^{-j\frac{\pi u(n+1)(n+1)}{L}}, & n = \frac{L}{2}, \frac{L}{2}+1, \ldots, L-1 \end{cases}$$

This sequence is centrally symmetric. Table 4 illustrates correlation properties for an example where L=62 and the set of root indices is u∈{21,29,41}.

TABLE 4

| Root index | Auto-correlation: Maximum false peak correlation | Cross-correlation with PSS: Maximum false peak, (PSS root index) |
|---|---|---|
| u = 21 | 0.28 | 0.26 |
| u = 29 | 0.26 | 0.24 |
| u = 41 | 0.29 | 0.22 |

The maximum cross-correlation among the D2DSSs generated from the set of root indices u∈{21,29,41} is 0.21.

In one embodiment, the same sequence structure as for the Zadoff-Chu sequences of odd length may be assumed, but then it may be specified an even number of phases and even sequence length. Mathematically, these new sequences may be described as:

$$d_u(n) = W_L^{\frac{un(n+1)}{2}}, n=0, 1, \ldots, L-1, L \text{ even}$$

$$W_L = e^{-j2\pi/L}.$$

For example, it is possible to assume L=62. It is noted that this sequence is not a Zadoff-Chu sequence. Table 5 contains correlation properties for an example where L=62 and the set of root indices is u∈{25,27,29}.

TABLE 5

| Root index | Auto-correlation: Maximum false peak correlation | Cross-correlation with PSS: Maximum false peak, (PSS root index) |
|---|---|---|
| u = 25 | 0.26 | 0.25 |
| u = 27 | 0.30 | 0.24 |
| u = 29 | 0.30 | 0.20 |

The maximum cross-correlation among the D2DSSs generated from the set of root indices u∈{25,27,29} is 0.21.

Furthermore, some of the herein described embodiments may be used in multi-user D2D communications compatible with LTE system. The herein described D2DSS may be transmitted by a D2D-enabled user equipment (UE), or any network node other than an eNodeB within the LTE system.

Figure 4:
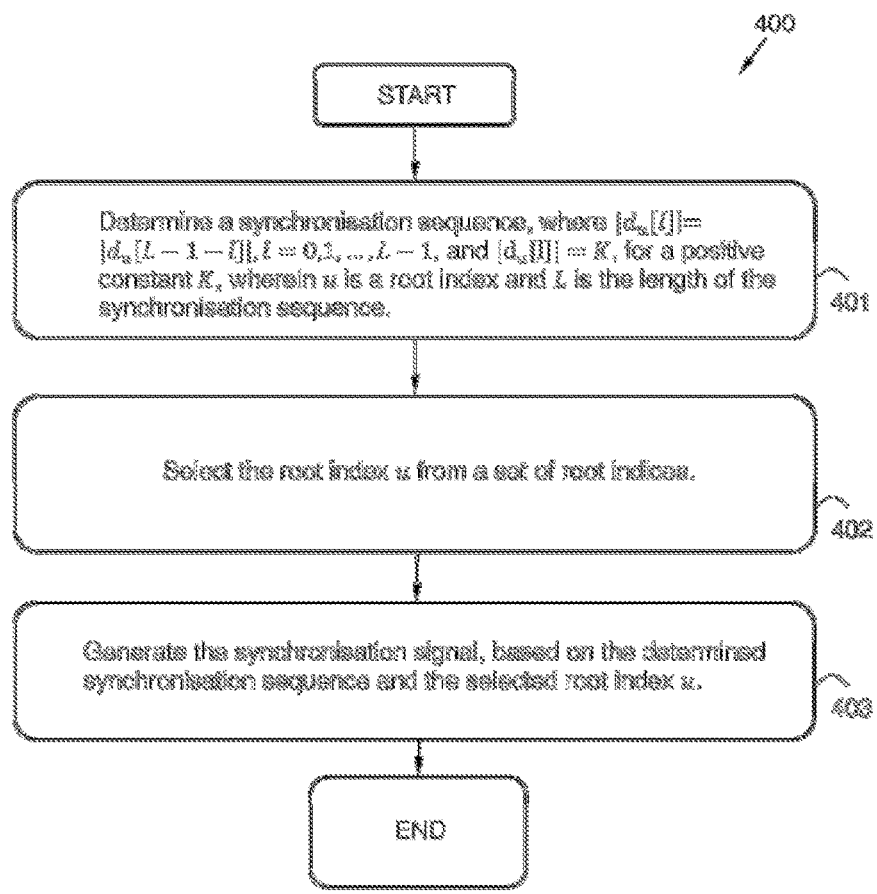
FIG. 4 is a flow chart illustrating a method in a transmitter according to an embodiment.

FIG. 4 is a flow chart illustrating embodiments of a method 400 for use in a transmitter 110, for generating a synchronization signal for D2D communications utilizing a SC-FDMA waveform, wherein a synchronization sequence is modulating a set of subcarriers.

To generate the synchronization signal for D2D communications, the method 400 may comprise a number of actions 401-403. It is however to be noted that any, some or all of the described actions 401-403, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 400 may comprise the following actions:

Action 401

A synchronization sequence is determined, where:

$$|d_u[l]|=|d_u[L-1-l]|, l=0,1,\ldots,L-1$$

and $$|d_u[l]|=K,$$

for a positive constant K, wherein u is an index and L is the length of the synchronization sequence.

In some embodiments, the synchronization sequence may be determined, such that:

$$d_u[l]=d_u[L-1-l], l=0,1,\ldots,L-1.$$

In some embodiments, a centrally anti-symmetric D2D synchronization sequence of even length may be obtained from a centrally symmetric D2D synchronization sequence of even length by multiplying the elements of one of the synchronization sequence halves by −1.

In some embodiments, the synchronization sequence may be determined, such that:

$$d_u[n]=\begin{cases} e^{-j\frac{\pi un(n+1)}{63}}, & n=0,1,\ldots,30 \\ e^{-j\frac{\pi u(n+1)(n+2)}{63}}, & n=31,32,\ldots,61 \end{cases}$$

In some embodiments, the synchronization sequence may be determined by selecting a Zadoff-Chu sequence of odd length, and removing an odd number of elements from the selected Zadoff-Chu sequence, to obtain a centrally symmetric synchronization sequence of even length.

However, in some embodiments, the synchronization sequence may be determined by selecting a Zadoff-Chu sequence of even length, extending the selected Zadoff-Chu sequence by one element, and removing a central element of the extended Zadoff-Chu sequence.

The synchronization sequence may in some further embodiments be determined such that:

$$d_u[n]=W_L^{un(n+1)/2}, n=0,1,\ldots,L-1, L \text{ even}$$

and $W_L=e^{-j2\pi/L}$.

Furthermore, according to some embodiments, the synchronization sequence may be mapped to the resource elements of the SC-FDMA signal, such that for the Fourier coefficients: $|H[k]|=|H[N-1-k]|$, k=0, 1, ..., N−1, where N is an integer not smaller than L.

However, in some such embodiments, $H[k]=H[N-1-k]$, k=0, 1, ..., N−1, while in some other embodiments $H[k]=-H[N-1-k]$, k=0, 1, ..., N−1.

Action 402

The root index u is selected from a set of root indices. In some embodiments, the indices comprised in the set of root indices may be relatively primes in relation to each other.

The root index u may be selected to an integer different from 25, 29 and 34.

The root index u may, according to some embodiments be selected from the set of root indices randomly.

The root index u my further be selected from the set of root indices by deriving it from one or more parameters internal to the transmitter 110.

Further, in some embodiments, the root index u may be selected from the set of root indices, based on information received from a serving radio network node 130.

In some embodiments, the root index u may be selected from the set of indices, based on a received signal, received, e.g., from the receiver 120, from another network node 140 or from the radio network node 130.

The root index u may further be selected from a first set of root indices when receiving a synchronization signal from another D2D transmitter synchronized to a cell, and from a second set of root indices when receiving a synchronization signal from a D2D transmitter, not synchronized to a cell.

Also, according to some embodiments, the same root index u may be selected as has been utilized in a received synchronization signal.

However, according to other embodiments, a different root index u may be selected, as has been utilised in a received synchronization signal.

The synchronization signal may, in some embodiments, be transmitted over multiple hops between network nodes 140 and wherein the root index u may be selected from the set of root indices, based on the number of hops of the received synchronization signal.

Action 403

The synchronization signal is generated, based on the determined 401 synchronization sequence and the selected 402 root index u.

Figure 5:
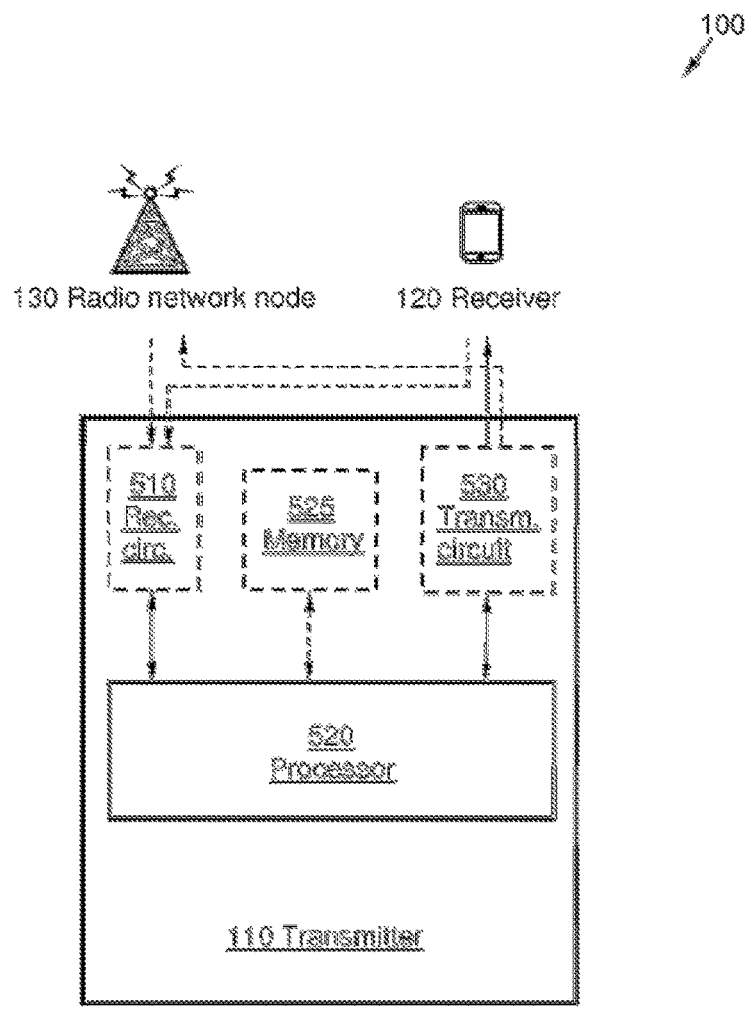
FIG. 5 is a block diagram illustrating a transmitter according to an embodiment.

FIG. 5 illustrates an embodiment of a transmitter 110, configured for generating a synchronization signal for Device-to-Device (D2D) communication utilizing a Single Carrier-Frequency Division Multiple Access (SC-FDMA) waveform, wherein a synchronization sequence is modulating a set of subcarriers. The transmitter 110 is further configured for performing the method 400 according to at least some of the previously described actions 401-403.

For enhanced clarity, any internal electronics or other components of the transmitter 110, not completely indispensable for understanding the herein described embodiments have been omitted from FIG. 5.

The transmitter 110 comprises a processor 520, configured for determining a synchronization sequence, where $|d_u[l]|=|d_u[L-1-l]|$, $l=0, 1, \ldots, L-1$, and $|d_u[l]|=K$, for a positive constant K wherein u is a root index and L is the length of the synchronization sequence. Also, the processor 520 is further configured for selecting the root index u from a set of root indices; and in addition configured for generating the D2D synchronization signal, based on the determined synchronization sequence and the selected root index u.

The processor 520 may be further configured for determining the synchronization sequence, such that: $d_u[l]=d_u[L-1-l]$, $l=0, 1, \ldots, L-1$.

In some embodiments, the processor 520 may be configured for obtaining a centrally anti-symmetric D2D synchronization sequence of even length from a centrally symmetric D2D synchronization sequence of even length by multiplying the elements of one of the synchronization sequence halves by −1.

The processor 520 may be further configured for determining the synchronization sequence, such that:

$$d_u[n] = \begin{cases} e^{-j\frac{\pi u n(n+1)}{63}}, & n = 0, 1, \ldots, 30 \\ e^{-j\frac{\pi u (n+1)(n+2)}{63}}, & n = 31, 32, \ldots, 61 \end{cases}$$

and may in addition also be configured for selecting the root index u to an integer different from 25, 29 and/or 34.

The processor 520 may further be configured for determining the synchronization sequence by selecting a Zadoff-Chu sequence of odd length, and removing an odd number of elements from the selected Zadoff-Chu sequence, to obtain a synchronization sequence of even length in some embodiments.

Alternatively, the processor 520 may be configured for determining the synchronization sequence by selecting a Zadoff-Chu sequence of even length, extending the selected Zadoff-Chu sequence by one element, and removing a central element of the extended Zadoff-Chu sequence.

The processor 520 may also be configured for determining the synchronization sequence such that:

$$d_u[n]=W_L^{un(n+1)/2}, n=0,1,\ldots,L-1, L \text{ even}$$

and $W_L=e^{-j2\pi/L}$.

Further, the processor 520 may be configured for mapping the synchronization sequence to the resource elements of the SC-FDMA signal, such that for the Fourier coefficients:

$$|H[k]|=|H[N-1-k]|, k=0,1,\ldots,N-1,$$

where N is an integer not smaller than L. In some such embodiments, the processor 520 may be configured for mapping the synchronization sequence such that $H[k]=H[N-1-k]$, $k=0, 1, \ldots, N-1$, and/or $H[k]=-H[N-1-k]$, $k=0, 1, \ldots, N-1$.

Such processor 520 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

The transmitter 110 also may comprise a transmitting circuit 530, configured for transmitting a signal, such as, e.g., a synchronization signal.

In further addition, the transmitter 110 may comprise a receiving circuit 510, configured for receiving signals, such as, e.g., synchronization signals, from other network nodes 120, 130, 140 over a wireless interface according to some embodiments.

Furthermore, the transmitter 110 may further comprise at least one memory 525, according to some embodiments. The optional memory 525 may comprise a physical device utilized to store data or a program, i.e., a sequence of instructions, on a temporary or permanent basis. According to some embodiments, the memory 525 may comprise integrated circuits comprising silicon-based transistors. Further, the memory 525 may be volatile or non-volatile.

Some or all of the above described actions 401-403 to be performed in the transmitter 110 may be implemented through the one or more processors 520 in the transmitter 110, together with a computer program product for performing at least some of the functions of the actions 401-403. Thus a computer program comprising program code may perform a method 400 according to any, at least some, or all of the functions of the actions 401-403 for generating a synchronization signal for D2D communications utilizing an SC-FDMA waveform, wherein a synchronization sequence is modulating a set of subcarriers, when the computer program is loaded into a processor 520 of the transmitter 110.

Further, a computer program product may comprise a computer readable storage medium storing program code thereon for use by the transmitter 110, for generating a synchronization signal for D2D communications utilizing an SC-FDMA waveform, wherein a synchronization sequence is modulating a set of subcarriers. The program code comprising instructions for executing a method 400 that comprises determining 401 a synchronization sequence, where $|d_u[l]|=|d_u[L-1-l]|$, $l=0, 1, \ldots, L-1$ and $|d_u[i]|=K$, for a positive constant K, wherein u is a root index and L is the length of the synchronization sequence; selecting 402 the root index u from the set of root indices; and generating 403 the synchronization signal, based on the determined 401 synchronization sequence and the selected 402 root index u.

The computer program product mentioned above may be provided for instance in the form of a data carrier carrying computer program code for performing at least some of the actions 401-403 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the transmitter 110 remotely, e.g., over an Internet or an intranet connection.

Figure 6:
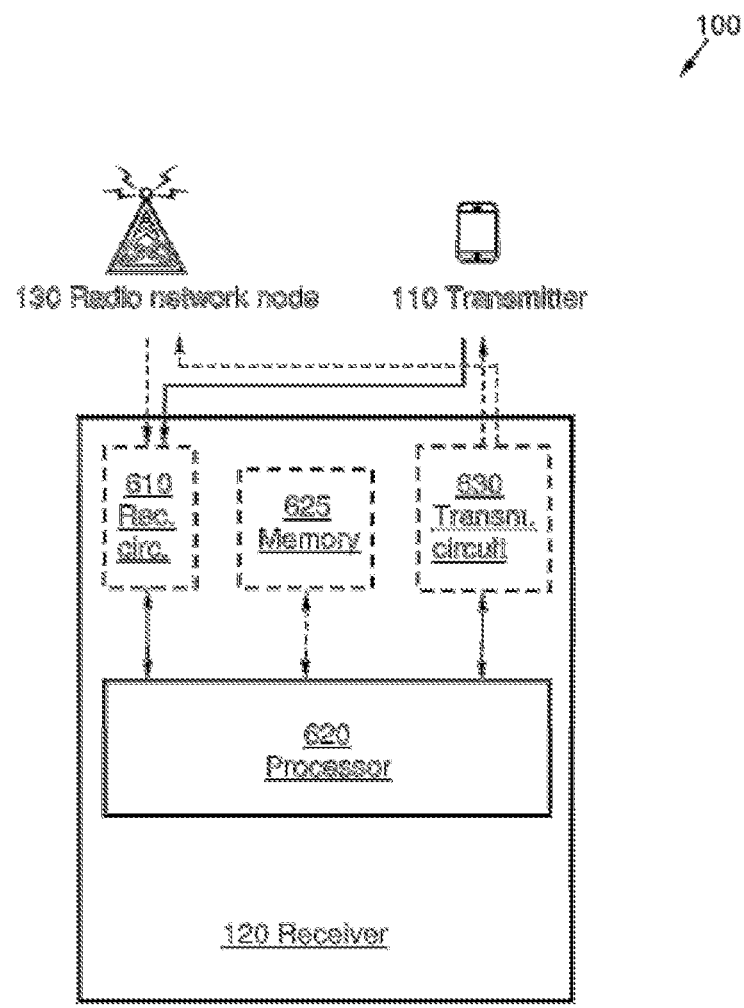
FIG. 6 is a block diagram illustrating a receiver according to an embodiment.

FIG. 6 illustrates an embodiment of a receiver 120, configured for detecting a received synchronization signal for D2D communications utilizing an SC-FDMA waveform, wherein a synchronization sequence is modulating a set of subcarriers. The synchronization signal for D2D communications may be received from the transmitter 110.

For enhanced clarity, any internal electronics or other components of the receiver 120, not completely indispensable for understanding the herein described embodiments have been omitted from FIG. 6.

The receiver 120 comprises a processor 620, configured for detecting the synchronization signal comprising a synchronization sequence, where $|d_u[l]|=|d_u[L-1-l]|$, $l=0, 1, \ldots, L-1$, and $|d_u[l]|=K$, for a positive constant K, wherein u is a root index and L is the length of the synchronization sequence.

Such processor 620 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Further, the receiver 120 comprises a receiving circuit 610, configured for receiving a signal such as, e.g., a synchronization signal, from, e.g., the transmitter 110.

However, the receiving circuit 610 may be configured for receiving radio signals of various types over a wireless interface from a plurality of transmitting entities, such as other network nodes 140, or the radio network node 130.

Furthermore, the receiver 120 also may in some embodiments comprise a transmitting circuit 630, configured for transmitting a wireless signal comprising, e.g., synchronization signal.

Furthermore, the receiver 120 may further comprise at least one memory 625, according to some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. Further, the memory 625 may be volatile or non-volatile.

The terminology used in the description of the embodiments as illustrated in the accompanying drawings is not intended to be limiting of the described method 400; transmitter 110 and/or receiver 120. Various changes, substitutions and/or alterations may be made, without departing from the invention as defined by the appended claims.

As used herein, the term "and/or" comprises any and all combinations of one or more of the associated listed items. In addition, the singular forms "a," "an" and "the" are to be interpreted as "at least one," thus also possibly comprising a plurality of entities of the same kind, unless expressly stated otherwise. It will be further understood that the terms "includes," "comprises," "including" and/or "comprising," specifies the presence of stated features, actions, integers, steps, operations, elements, and/or components, but do not preclude the presence or addition of one or more other features, actions, integers, steps, operations, elements, components, and/or groups thereof. The term "or" as used herein, is to be interpreted as a mathematical OR, i.e. as an inclusive disjunction; not as a mathematical exclusive OR (XOR), unless expressly stated otherwise. A single unit such as, e.g., a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A transmitter, comprising:
a processor; and
a non-transitory computer-readable storage medium storing a program to be executed by the processor, the program including instructions for:
determining a synchronization sequence $d_u[l]$ modulating a set of subcarriers, where $|d_u[l]|=|d_u[L-1-l]|$, $l=0, 1, \ldots, L-1$, and $|d_u[l]|=K$, for a positive constant K, wherein u is a root index and L is a length of the synchronization sequence $d_u[l]$;
selecting the root index u from a set of root indices; and
generating, and transmitting to a receiver, a synchronization signal for Device-to-Device (D2D) communication utilizing a Single Carrier-Frequency Division Multiple Access(SC-FDMA) waveform based on the determined synchronization sequence $d_u[l]$ and the selected root index u, wherein the receiver uses the synchronization signal to establish time and frequency synchronization with the transmitter according to the selected root index u.

2. The transmitter according to claim 1, wherein the program further includes instructions for determining the synchronization sequence $d_u[l]$, such that:

$$d_u[l]=-d_u[L-1-l], l=0,1,\ldots,L-1.$$

3. The transmitter according to claim 1, wherein the program further includes instructions for obtaining a centrally anti-symmetric synchronization sequence of even length from a centrally symmetric synchronization sequence of even length by multiplying elements of one of synchronization sequence halves by −1.

4. The transmitter according to claim 1, wherein the program further includes instructions for:
determining the synchronization sequence $d_u[n]$, such that:

$$d_u[n]=\begin{cases} e^{-j\frac{\pi un(n+1)}{63}}, & n=0,1,\ldots,30 \\ e^{-j\frac{\pi u(n+1)(n+2)}{63}}, & n=31,32,\ldots,61 \end{cases};$$

and
selecting the root index u to an integer different from 25, 29 and 34.

5. The transmitter according to claim 1, wherein the program further includes instructions for:
determining the synchronization sequence by selecting a Zadoff-Chu sequence of odd length; and
removing an odd number of elements from the selected Zadoff-Chu sequence, to obtain a synchronization sequence of even length.

6. The transmitter according to claim 1, wherein the program further includes instructions for determining the synchronization sequence $d_u[n]$ such that:

$$d_u[n]=W_L^{un(n+1)/2}, n=0,1,\ldots,L-1, L \text{ even}$$

and $W_L=e^{-j2\pi/L}$.

7. The transmitter according to claim 1, wherein the program further includes instructions for mapping the synchronization sequence to resource elements of the SC-FDMA signal, such that for Fourier coefficients:

$$|H[k]|=|H[N-1-k]|, k=0,1,\ldots,N-1,$$

where N is an integer not smaller than L and H[k] is a Fourier coefficient at frequency k.

8. The transmitter according to claim 7, wherein:

$$H[k]=H[N-1-k], k=0,1,\ldots,N-1.$$

9. The transmitter according to claim 8, wherein:

$$s[n]=-s[N-n], n=1,\ldots,N-1, s[n] \text{ is a SC-FDMA signal}, n=0,1,\ldots,N-1.$$

10. The transmitter according to claim 7, wherein:

$$H[k]=-H[N-1-k], k=0,1,\ldots,N-1.$$

11. The transmitter according to claim 1, wherein the program further includes instructions for selecting the root index u from the set of root indices by one of random selection or by deriving the root index u from one or more parameters internal to the transmitter.

12. The transmitter according claim 1, wherein the program further includes instructions for performing at least one of:
   selecting the root index u from the set of root indices based on information received from a serving radio network node or based on a received signal;
   selecting the root index u from a first set of root indices when receiving a synchronization signal from another D2D transmitter being synchronized to a cell, and from a second set of root indices when receiving a synchronization signal from another D2D transmitter not being synchronized to a cell;
   by selecting either the same, or a different, root index u as has been utilized in a received synchronization signal; and
   selecting the root index u from the set of root indices based on a number of hops of the received synchronization signal when the synchronization signal is transmitted over multiple hops between network nodes.

13. A method, comprising:
   determining, by a transmitter, a synchronization sequence $d_u[l]$ modulating a set of subcarriers, where $$|d_u[l]|=|d_u[L-1-l]|, l=0,1,\ldots,L-1, \text{ and}$$

$$|d_u[l]|=K,$$

for a positive constant K, wherein u is a root index and L is a length of the synchronization sequence $d_u[l]$;
   selecting the root index u from a set of root indices; and
   generating, and transmitting to a receiver, a synchronization signal for Device-to-Device (D2D) communication utilizing a Single Carrier-Frequency Division Multiple Access (SC-FDMA) waveform based on the determined synchronization sequence $d_u[l]$ and the selected root index u, wherein the receiver uses the synchronization signal to establish time and frequency synchronization with the transmitter according to the selected root index u.

14. The method according to claim 13, wherein the method comprises mapping the synchronization sequence to resource elements of the SC-FDMA waveform, such that for Fourier coefficients:

$$|H[k]|=|H[N-1-k]|, k=0,1,\ldots,N-1,$$

where N is an integer not smaller than L and H[k] is a Fourier coefficient at frequency k.

15. The method according to claim 14, wherein:

$$H[k]=H[N-1-k], k=0,1,\ldots,N-1.$$

16. The method according to claim 15, wherein:

$$s[n]=-s[N-n], n=1,\ldots,N-1, s[n] \text{ is a SC-FDMA signal, and } n=0,1,\ldots,N-1.$$

17. An apparatus comprising a non-transitory computer readable storage medium having program code stored thereon for use by a transmitter, the program code including instructions for:
   determining a synchronization sequence $d_u[l]$ modulating a set of subcarriers, where $$|d_u[l]|=|d_u[L-1-l]|, l=0,1,\ldots,L-1, \text{ and}$$

$$|d_u[l]|=K,$$

for a positive constant K, wherein u is a root index and L is a length of the synchronization sequence $d_u[l]$;
   selecting the root index u from the set of root indices; and
   generating, and transmitting to a receiver, a synchronization signal for Device-to-Device (D2D) communication utilizing a Single Carrier-Frequency Division Multiple Access (SC-FDMA) waveform based on the determined synchronization sequence $d_u[l]$ and the selected root index u, wherein the receiver uses the synchronization signal to establish time and frequency synchronization with the transmitter according to the selected root index u.

18. The apparatus according to claim 17, wherein the program code further includes instructions for mapping the synchronization sequence to the resource elements of the SC-FDMA waveform, such that for Fourier coefficients:

$$|H[k]|=|H[N-1-k]|, k=0,1,\ldots,N-1,$$

where N is an integer not smaller than L and H[k] is a Fourier coefficient at frequency k.

19. The apparatus according to claim 18, wherein:

$$H[k]=H[N-1-k], k=0,1,\ldots,N-1.$$

20. The apparatus according to claim 19, wherein:

$$s[n]=-s[N-n], n=1,\ldots,N-1, s[n] \text{ is a SC-FDMA signal}, n=0,1,\ldots,N-1.$$

* * * * *